United States Patent [19]

Matsumoto

[11] Patent Number: 5,103,621
[45] Date of Patent: Apr. 14, 1992

[54] FILM SPREADING DEVICE FOR USE IN WRAPPING APPARATUS

[76] Inventor: Ryozo Matsumoto, 239-9, Oaza-Tanaka, Fukuoka, Japan

[21] Appl. No.: 648,296

[22] Filed: Jan. 31, 1991

[30] Foreign Application Priority Data

Jan. 31, 1990 [JP] Japan .................................. 2-21071

[51] Int. Cl.$^5$ ............................................. B65B 11/04
[52] U.S. Cl. ...................................... 53/556; 53/587; 53/141; 53/389.4
[58] Field of Search ................. 53/141, 211, 587, 588, 53/556, 118, 441, 389.4; 264/290.2

[56] References Cited

U.S. PATENT DOCUMENTS

| | | |
|---|---|---|
| 2,597,041 | 5/1952 | Stokes et al. . |
| 2,728,941 | 1/1956 | Alles et al. . |
| 3,148,410 | 9/1964 | Laurie . |
| 4,087,226 | 5/1978 | Mercer ............................ 264/290.2 |
| 4,116,892 | 9/1978 | Schwarz .......................... 264/290.2 |
| 4,144,008 | 3/1979 | Schwarz .......................... 264/290.2 |
| 4,144,697 | 3/1979 | Suga . |
| 4,153,751 | 5/1979 | Schwarz . |
| 4,223,059 | 9/1980 | Schwarz . |
| 4,236,285 | 12/1980 | Gallant . |
| 4,251,585 | 2/1981 | Schwarz . |
| 4,285,100 | 8/1981 | Schwarz . |
| 4,368,565 | 1/1983 | Schwarz .......................... 264/290.2 |
| 4,374,690 | 2/1983 | Canterino et al. . |
| 4,418,510 | 12/1983 | Lancaster, III et al. . |
| 4,497,159 | 2/1985 | Lancaster, III . |
| 4,722,170 | 2/1988 | Ball et al. . |
| 4,745,726 | 5/1988 | Rosenthal et al. . |

FOREIGN PATENT DOCUMENTS

| | | |
|---|---|---|
| 0081328 | 6/1983 | European Pat. Off. . |
| 0271256 | 6/1988 | European Pat. Off. . |
| 0342914 | 11/1989 | European Pat. Off. . |
| 343453 | 11/1989 | European Pat. Off. ............. 53/556 |
| 3815985 | 11/1989 | Fed. Rep. of Germany ........ 53/587 |
| 1295212 | 4/1962 | France . |
| 400589 | 10/1933 | United Kingdom . |

*Primary Examiner*—John Sipos
*Attorney, Agent, or Firm*—Cushman, Darby & Cushman

[57] ABSTRACT

A spreader is positioned downstream of stretching rollers arranged to stretch a plastic film laterally and longitudinally. The spreader comprises a plurality of freely rotatable rollers arranged along an arc so as to spread the stretched plastic film laterally. A pair of guide rollers are provided for guiding the spread and stretched plastic film to a load.

1 Claim, 2 Drawing Sheets

FILM SPREADING DEVICE FOR USE IN WRAPPING APPARATUS

FIELD OF THE INVENTION

The present invention relates to an apparatus for wrapping a load with a stretchable plastic film while stretching the plastic film both laterally and longitudinally and, more particularly, to a device for spreading the stretched plastic film laterally before the stretched plastic film is wound around the load.

BACKGROUND OF THE INVENTION

Various wrapping apparatuses have been commercially available which are capable of wrapping loads such as a stack of corrugated cardboard boxes with a very thin plastic film while stretching the plastic film. A typical example of such an apparatus has a turntable for carrying the load, a supporting post which is spaced apart a predetermined distance from the turntable and carrying a film roll, and primary and secondary rollers which are spaced apart from each other and through which the plastic film unrolled from the film roll is delivered while being preliminarily stretched by these rollers. Namely, the plastic film is stretched between the primary and secondary rollers which rotate at different peripheral speeds and is then wound around the load on the rotating turntable, thereby wrapping the load.

In this known apparatus, if the height of the load on the turntable is greater than the width of the film, it is necessary that the film is frequently moved up and down relative to the load during wrapping so that the film is wound a plurality of times with partial overlaps between adjacent turns. Another problem is that the load such as a stack of goods tend to be collapsed during winding particularly when the load is small in weight and when the width of the film is much smaller than the height of the load. In addition, a considerably large length of the film is consumed because the film has to be wound in a multiplicity of turns.

Under this circumstance, the present inventors have proposed a wrapping method and apparatus in which the plastic film is also stretched laterally to a value which approximate the height of the article as much as possible immediately before the wrapping, thereby overcoming the above-described problems of the prior art.

In this proposed apparatus, a pair of stretching rollers are disposed between the load and the film roll, the stretching rollers having alternating peripheral ridges and peripheral grooves and arranged such that the peripheral ridges and grooves of both rollers mesh with each other. In operation, the plastic film pulled out from the film roll is passed through the nip between the meshing ridges and grooves of both stretching rollers while the stretching rollers are driven at different speeds, whereby the film is stretched both laterally and longitudinally. Then, the stretched film is spread laterally to a greater width and the load is wrapped with this film having an increased width. The lateral spreading of the film is conducted by spreader means capable of gripping both breadthwise ends of the film. The spreader means is so constructed that the angle of divergence of the spreader means is controllable in accordance with the increment of the width attained by the stretching operation.

The amount of stretching is adjustable by varying the distance between both stretching rollers, i.e., the state of meshing between peripheral ridges and peripheral grooves of both rollers. A change in the amount of lateral stretching essentially requires a readjustment of the angle of divergence of the spreder means for the purpose of varying also the degree of spreading. Hitherto, a special device has been required for effecting such an adjustment of the angle of divergence. Furthermore, the known spreader is complicated in construction and is difficult to handle when, for example, setting the film thereon.

SUMMARY OF THE INVENTION

An object of the invention is to provide a spreading device for use in a wrapping apparatus of the type described, which is simple in construction and easy to handle and which is capable of conveniently spreading a film which has been stretched laterally and longitudinally through meshing stretching rollers.

Accordingly, an object of the present invention is to provide a wrapping apparatus comprising: a turntable for carrying a load, a carriage mounted for vertically reciprocating movement on a support post which is disposed at a predetermined distance from the turntable, a roll of a stretchable wrapping film supported on the carriage, a pair of stretching rollers supported on the carriage at downstream side of the film roll and having vertical axes, the stretching rollers having outer peripheral ridges and grooves formed alternatingly, the stretching rollers being arranged such that the outer peripheral ridges and grooves thereof mesh with each other and being driven at different speeds so as to stretch the film both laterally and longitudinally, a spreader supported from the carriage and composed of a plurality of freely rotatable rollers arranged along an arc so as to spread the plastic film laterally, and a pair of guide rollers for guiding the spread and stretched plastic film to the load.

It is assumed that a stretchable plastic film is extracted from a roll and led through the nip between the stretching rollers, rollers of the spreader and through the guide rollers. On the other hand, a load, i.e. a stack of articles such as corrugated cardboard boxes is placed on the turntable. The leading end of the film is then anchored on the stack by being pinched between articles. The apparatus is then started The turntable is rotatively driven to provide a peripheral speed of the stack which is slightly greater than the speed of the film delivered from the stretching rollers. As a result, the film is wound around the stack. Meanwhile, the carriage is moved up and down so that the film is wound in a plurality of turns with partial overlap between adjacent turns. During the winding, the film passing through the nip between the stretching rollers is forcibly stretched both laterally and longitudinally by the action of the meshing outer peripheral ridges and grooves of both stretching rollers. The stretched plastic film is then pulled along the spreader rollers arranged in an arcuate form and is spread laterally at a diverging angle $\theta$. The spread plastic film is then directed or guided through the guide rollers towards the stack to be wrapped.

BRIEF DESCRIPTION OF THE DRAWINGS

An embodiment of the wrapping apparatus of the present invention will be described with reference to the accompanying drawings in which.

DESCRIPTION OF THE PREFERRED EMBODIMENT

Figure 1:
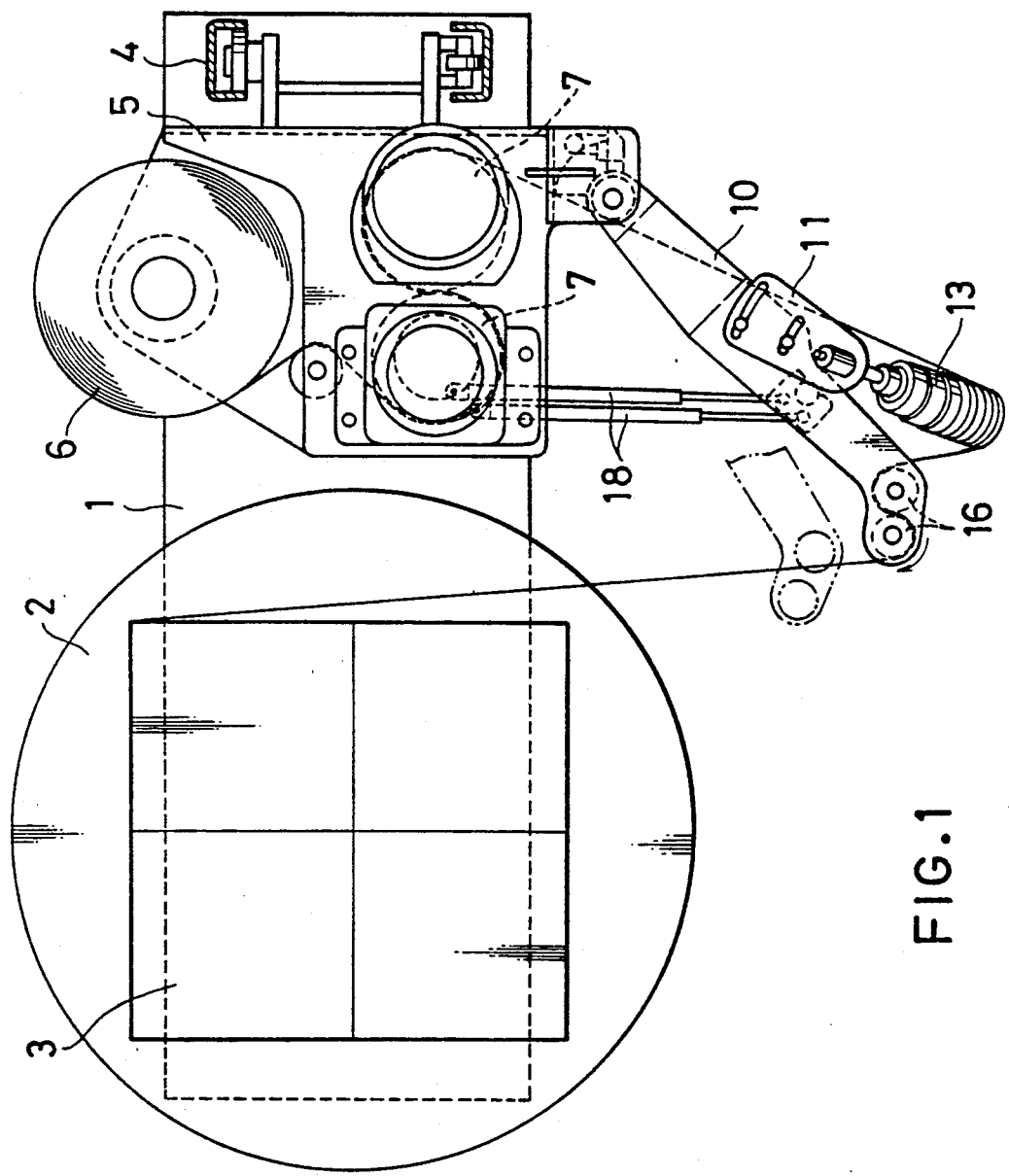
FIG. 1 is a plan view of an apparatus in accordance with the present invention.
Figure 2:
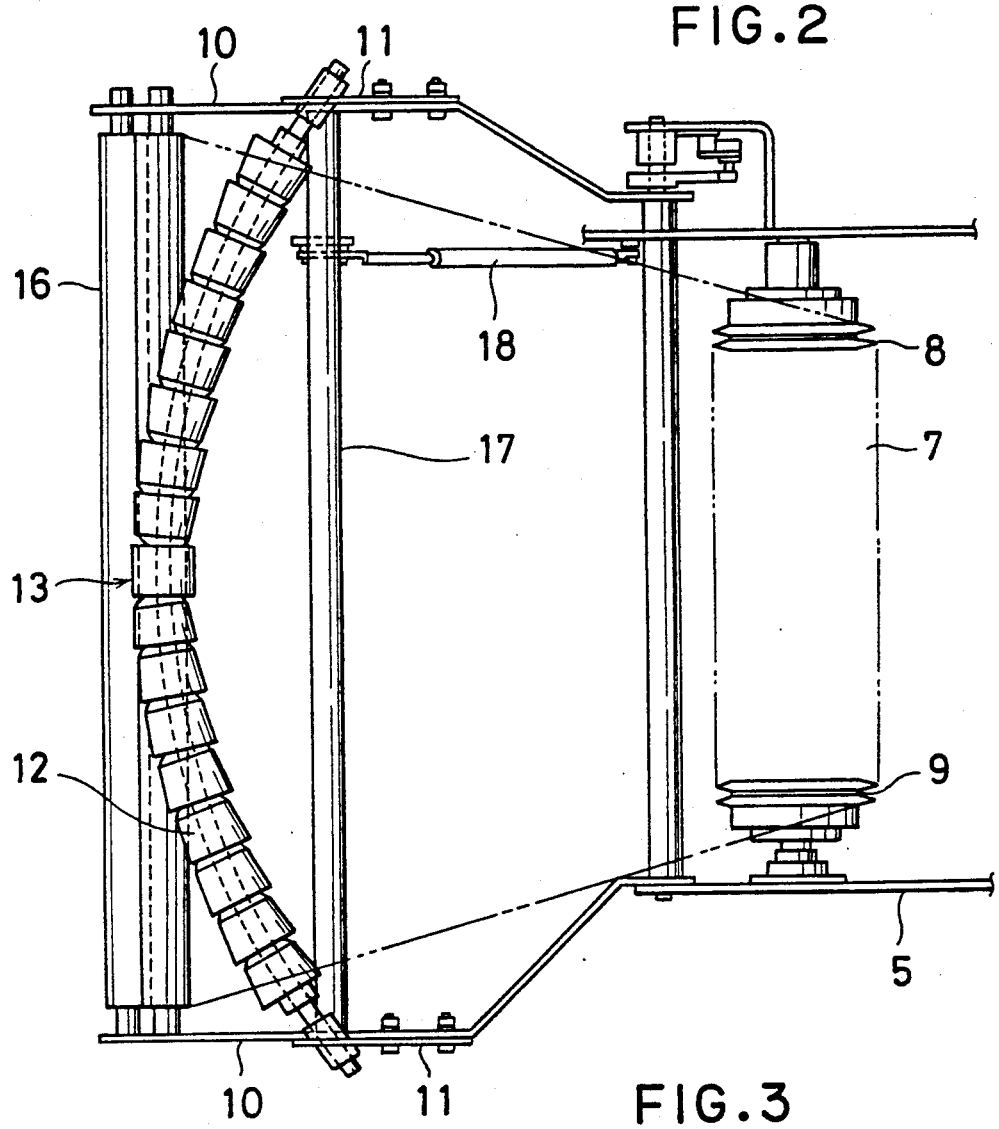
FIG. 2 is a side elevational view of a spreader for spreading laterally a plastic film after stretching.

Referring to FIGS. 1 and 2, a wrapping apparatus of the present invention has a turntable 2 which is rotatably supported on a base 1. The turntable carries the load to be wrapped, e.g., a stack of a plurality of corrugated cardboard boxes 3 placed on a pallet (not shown). A support post 4 is positioned at a predetermined distance from the turntable and guides a carriage 5 for vertically reciprocating movement. The carriage carries a roll 6 of a stretchable wrapping plastic film and a pair of stretching rollers 7 disposed downstream of the film roll and having vertical axes. The stretching rollers have a plurality of peripheral ridges 8 and peripheral grooves 9 arranged alternatingly and are arranged such that the peripheral ridges and peripheral grooves of both rollers mesh with each other so as to stretch the plastic film nipped therebetween both laterally and longitudinally. These stretching rollers are adapted to be driven in opposite directions such that the peripheral speed of the downstream stretching roller is greater than that of the upstream stretching roller.

Figure 3:
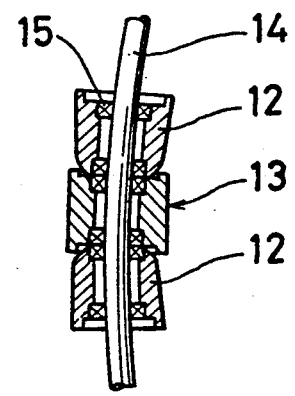
FIG. 3 is a sectional view of a portion of the spreader illustrative of the arrangement of rollers in the spreader.

A spreader 13 is composed of a plurality of freely rotatable rollers 12 which are disposed along an arc for the purpose of spreading laterally the plastic film which has been stretched laterally and longitudinally. The spreader 13 is supported on brackets 11,11 which are adjustably mounted on upper and lower supporting arms 10, 10 pivotally connected to the carriage 5. As will be clearly seen from FIG. 3, the free rotation of the rollers 12 is achieved by mounting these rollers 12, through bearings 15, on a shaft 14 which is supported at its both ends by the brackets 11,11 and which has straight sections in number equal to the number of the rollers 12. In order to prevent the film from being caught between adjacent rollers, it is preferred that the rollers other than a cylindrical roller on the mid portion of the shaft 14 have slightly tapered outer surfaces. A pair of guide rollers 16 are arranged downstream of the spreader 13 and are rotatably supported at their both ends by the support arms 10, 10. Pneumatic spring units 18 are connected between a portion of the carriage and a connecting rod 17 which interconnects the upper and lower supporting arms 10, 10. The pneumatic spring units 18 act to push the support arms 10, 10 against the tensile force on the plastic film which is pulled through the guide rollers during the winding.

The leading end of the plastic film unwound from the roll 6 is threaded between the nip of the stretching rollers 7, spreader 13 and the guide rollers 16 and is fastened to the load by being, for example, pinched between the stacked articles. The apparatus is then started. The turntable 2 is rotated such that the peripheral speed of the load to be wrapped is greater than the speed of feed of the film from the stretching rollers 7. As a result, the film is wound around the load under further stretching condition to wrap the same. Meanwhile, the carriage 5 is vertically moved up and down so that the film is wound around the load to cover the entire height of the load, with partial overlap between adjacent turns. During the winding, the film passing through the nip between the peripheral ridges 8 and peripheral grooves 9 of the meshing stretching rollers is stretched both laterally and longitudinally by the action of these peripheral ridges and grooves. The plastic film thus stretched is pulled along rollers 12 of the spreader 13 arranged on an arc so as to be expanded or spread laterally at an angle $\theta$ by the effect of the rollers 12 of the spreader. The plastic film thus spread is directed or guided towards the load 3 through the guide rollers 16. Consequently, the film is spread laterally to have a width which is substantially the same as the height of the load. It is therefore possible to securely wrap the load with a reduced number of turns of the film.

An adjustment of the distance between the stretching rollers, i.e., the degree of meshing between the outer peripheral ridges and grooves of both stretching rollers, varies the amount of lateral stretching of the plastic film and, hence, the width obtained after the spreading. According to the invention, this can be accomplished simply by passing the stretched film onto the spreader, without requiring any change in the position of the spreader. Thus, according to the invention, the film width optimum for the the load is attained simply by adjusting the amount of stretching of the film in accordance with the size (width and height) of the load.

I claim:

1. A wrapping apparatus comprising:

a turntable for carrying a load;

a carriage for vertical reciprocating movement mounted on a support post, said support post disposed at a predetermined distance form said turntable;

a roll of stretchable plastic wrapping film supported on said carriage;

a pair of stretching rollers supported on said carriage disposed at the downstream side of said wrapping film and having vertical axes, said stretching rollers having outer peripheral ridges and grooves formed alternatively, said stretching rollers being arranged such that the outer peripheral ridges and grooves thereof mesh with each other, said stretching rollers being driven at different speeds so as to stretch said wrapping film both laterally and longitudinally;

a spreader disposed downstream of said stretching rollers wherein said spreader comprises a plurality of freely rotatable rollers arranged along on arc so as to spread said wrapping film laterally, said spreader supported from upper and lower supporting arms pivotably mounted on said carriage, said spreader having a pair of guide rollers rotatably supported on said supporting arms for guiding the spread an stretched wrapping film to said load;

a means for pushing said supporting arms against a tensile force exerted on said wrapping film when said wrapping film is pulled through said guide rollers during winding.

* * * * *